(12) United States Patent
Liu et al.

(10) Patent No.: US 11,512,846 B2
(45) Date of Patent: Nov. 29, 2022

(54) HEADSET

(71) Applicant: Sufang Liu, Guangdong (CN)

(72) Inventors: Ming Liu, Guangdong (CN); Tingyao Yang, Guangdong (CN); Juxin Zhai, Guangdong (CN); Qun Guo, Guangdong (CN)

(73) Assignee: Sufang Liu, Guangdong (CN)

( * ) Notice: Subject to any disclaimer, the term of this patent is extended or adjusted under 35 U.S.C. 154(b) by 0 days.

(21) Appl. No.: 17/397,212

(22) Filed: Aug. 9, 2021

(65) Prior Publication Data
US 2022/0333768 A1 Oct. 20, 2022

(30) Foreign Application Priority Data

Apr. 16, 2021 (CN) .......................... 202110415811.8

(51) Int. Cl.
*H04R 1/10* (2006.01)
*F21V 33/00* (2006.01)

(52) U.S. Cl.
CPC ....... *F21V 33/0056* (2013.01); *H04R 1/1008* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,824,265 B1 * | 11/2004 | Harper | ................... | G02C 11/04 351/158 |
| 7,114,823 B2 * | 10/2006 | McCullough | ....... | F21V 33/0056 381/74 |
| 8,075,153 B2 * | 12/2011 | Werner | ............... | F21V 33/0064 2/209 |
| 9,143,595 B1 * | 9/2015 | Dowd | ................. | H04M 1/6091 |

(Continued)

FOREIGN PATENT DOCUMENTS

| CN | 200962662 Y | * | 10/2007 | ............... | H04R 1/10 |
|---|---|---|---|---|---|
| CN | 201018657 Y | * | 2/2008 | ............. | H04R 5/033 |

(Continued)

OTHER PUBLICATIONS

The Extended European Search Report dated Mar. 17, 2022; Appln. No. 21180240.0.

*Primary Examiner* — Oyesola C Ojo

(57) ABSTRACT

A headset includes two earplug components each including an earphone shell defining an accommodating cavity and a control device in the accommodating cavity, a connecting member connecting two earphone shells, a first light emitting component includes a first light source in the accommodating cavity of at least one earphone shell and electrically connected with the control device and a light emitting tube, and a second light emitting components configured in the accommodating cavity and electrically connected with the control device. Each earphone shell is connected with both ends of the light emitting tube, an optical adjusting member is to transmit light from the first light source to the (Continued)

light emitting tube. A surface of one earphone shell away from the other earphone shell is defined with an emitting channel communicating with the accommodating cavity. Light from the second light emitting component is emitted through the emitting channel.

12 Claims, 16 Drawing Sheets

(56) References Cited

U.S. PATENT DOCUMENTS

| | | | |
|---|---|---|---|
| 9,717,633 B2* | 8/2017 | Waters | A41D 13/0002 |
| 9,803,852 B1* | 10/2017 | Clacken | H04R 1/1058 |
| 10,015,576 B1* | 7/2018 | Mungin | H04R 1/1008 |
| 2005/0175210 A1* | 8/2005 | Yang | H04R 1/1033 |
| | | | 381/370 |
| 2007/0047740 A1* | 3/2007 | Andrea | H04R 1/1041 |
| | | | 381/74 |
| 2007/0053634 A1 | 3/2007 | Carver et al. | |
| 2011/0103607 A1* | 5/2011 | Bychkov | H04R 1/1033 |
| | | | 381/384 |
| 2016/0109633 A1 | 4/2016 | Kida et al. | |
| 2016/0150311 A1* | 5/2016 | Bremyer | H04R 1/1008 |
| | | | 381/371 |
| 2016/0337745 A1* | 11/2016 | Adams | H04R 1/1041 |
| 2016/0349425 A1 | 12/2016 | Chang | |

FOREIGN PATENT DOCUMENTS

| | | | | |
|---|---|---|---|---|
| CN | 203827495 U | * | 9/2014 | H04R 1/10 |
| CN | 210444465 U | * | 5/2020 | H04R 1/10 |
| CN | 210579136 U | | 5/2020 | |
| CN | 211457351 U | | 9/2020 | |

* cited by examiner

HEADSET

CROSS REFERENCE OF THE DISCLOSURE

The present disclosure present application claims the benefits of: Chinese Patent with No. 202110415811.8, which is filed on Apr. 16, 2021, and the entire disclosure of which is hereby incorporated by reference, in its entirety, for all that it teaches and for all purposes.

TECHNICAL FIELD

The present application is related to the technical field of headset, in particular to a headset.

BACKGROUND

At present, headsets are worn on the user's head using ear-covered headsets, so that users can listen to music from a sound source such as a playing equipment and realize interactive processing of audio signals. A general headset has a pair of playing units and a connecting member connecting the two playing units.

In order to increase the ornamental value of headsets, headsets currently on the market are usually provided with light emitting elements to generate light emitting effects, but the light emitting direction is relatively single, resulting in unsatisfactory light emitting effects and poor visual effects, which cannot meet the needs of users.

SUMMARY

The main object of the present application is to provide a headset which can increase luminous area and luminous effect.

To realize the above purpose, the present application provides a headset, which including:

two earplug components, each of the earplug components including an earphone shell and a control device, where the earphone shell is defined with an accommodating cavity, and the control device is configured in the accommodating cavity;

a connecting member connecting two earphone shells;

a first light emitting component including a first light source and a light emitting tube, where the first light source is configured in the accommodating cavity of at least one of the two earphone shells and electrically connected with the control device, two ends of the light emitting tube are respectively connected with the two earphone shells, an optical adjusting member is configured between the light emitting tube and the first light source, and light emitted by the first light source is transmitted to the light emitting tube through the optical adjusting member; and a second light emitting component, where the second light emitting component is configured in at least one of two accommodating cavities and is electrically connected with the control device in the at least one of two accommodating cavities, an emitting channel communicating with the at least one of two accommodating cavity is defined on a surface of one of the two earphone shells facing away from another of the two earphone shells, and the light emitted by the second light emitting component is emitted through the emitting channel.

In an embodiment of the present application, the control device includes a circuit board, the first light source is configured on the circuit board, and the optical adjusting member is a convex lens.

In an embodiment of the present application, the first light source is located at a focal position of the optical adjusting member, and the optical adjusting member is attached to an end of the light emitting tube; and/or, a cross section of the light emitting tube is in a circular shape, a height of the optical adjusting member is equal to an inner diameter of the light emitting tube.

In an embodiment of the present application, the first light emitting component includes two light emitting tubes and the two light emitting tubes are configured at intervals, and two ends of each of the two light emitting tubes are respectively connected with the two earphone shells.

In an embodiment of the present application, the first light source is located on a middle line of a line connecting two adjacent ends of the two light emitting tubes, and the optical adjusting member includes two mirror tubes, one end of each of the mirror tubes is communicated with an end of one of the light emitting tube, and the other end of each of the mirror tubes half covers the light source; and/or, the first light emitting component includes two first light sources, one of the two first light sources corresponds to one of the two light emitting tubes, and the optical adjusting member is a convex lens.

In an embodiment of the present application, each of the two earphone shells includes a body and a cover plate, the body is defined with the accommodating cavity and a mounting opening communicated with the accommodating cavity, the mounting opening is covered by the cover plate, with an edge of the mounting opening and a periphery of the cover plate enclosing to define the emitting channel.

In an embodiment of the present application, the emitting channel is annular; and/or, the emitting channel is arc-shaped in a direction from the accommodating cavity to an outside; and/or, the second light emitting component includes a second light source and a light guiding plate, the second light source and the light guiding plate are both installed on the body, and light emitted by the second light source is emitted to the emitting channel after passing through the light guiding plate.

In an embodiment of the present application, a side of the body facing away from the mounting opening is defined with an opening communicating with the accommodating cavity, and the earplug component further includes:

a supporting frame connected with the body, covering the opening, and defined with a sound exit hole;

a speaker connected to the supporting frame and located in the accommodating cavity; and a sound chamber cover located in the accommodating cavity, and defining a sound chamber with the supporting frame, where the sound exit hole is communicated with the sound chamber.

In an embodiment of the present application, a surface of the supporting frame facing the accommodating cavity is recessed to form a mounting groove, the speaker is embedded in the mounting groove, and an opening of the mounting groove is covered by the sound chamber cover to form the sound chamber; and/or, the sound chamber cover is detachably connected to the supporting frame.

In an embodiment of the present application, the earplug component further includes a vibration motor and a main control board, the main control board is electrically connected with the speaker and the vibration motor, the vibration motor is connected with the supporting frame and located in the accommodating cavity, and the main control board is connected with the sound chamber cover and located in the accommodating cavity.

The headset of the technical scheme of the present application includes two earplug components and a connecting member, the two earplug components includes an earphone shell and a control device configured in the earphone shell, and the connecting member is connected to the two earphone shells to play a role of connecting and supporting, so that the two earplug components are fixed on two ears.

At the same time, the headset also includes a first light emitting component and a second light emitting component, which can emit light from multiple directions, increasing a light emitting area and enhancing a light emitting effect, and meeting needs of users.

Secondly, the first light emitting component includes a first light source, a light emitting tube and an optical adjusting member. The first light source is configured in the earphone shell and electrically connected with the control device. The first light source emits light under a control of the control device, and the light is emitted to the end of the light emitting tube through the optical adjusting member, so that the light emitting tube emits light as a whole, and the light emitting tube is located at a top of a head, which not only increases the light emitting area, but also becomes more eye-catching. At the same time, the optical adjusting member can adjust light emitted by the light source so that it is directed to the light emitting tube at a better angle or concentration, effectively improving a utilization rate of light and a light emitting effect.

In addition, the second light emitting component is configured in an accommodating cavity, and an outer surface of the earphone shell is provided with an emitting channel communicated with the accommodating cavity, and light emitted by the second light emitting component is directly emitted through the emitting channel, so that an outer surface of the earphone shell produces a light emitting effect without passing through a light transmitting member, realizing higher light transmittance and brightness, and significantly improving the light emitting effect.

BRIEF DESCRIPTION OF THE DRAWINGS

In order to explain more clearly the embodiments of the present application or the technical solutions in the related art, the following will briefly describe the drawings needed to be used in the description of embodiments or the related art. Apparently, the accompanying drawings described below are merely some embodiments of the present application, and other drawings may be obtained without creative effort by one of ordinary skill in the art from the structure shown in those drawings.

Figure 1:
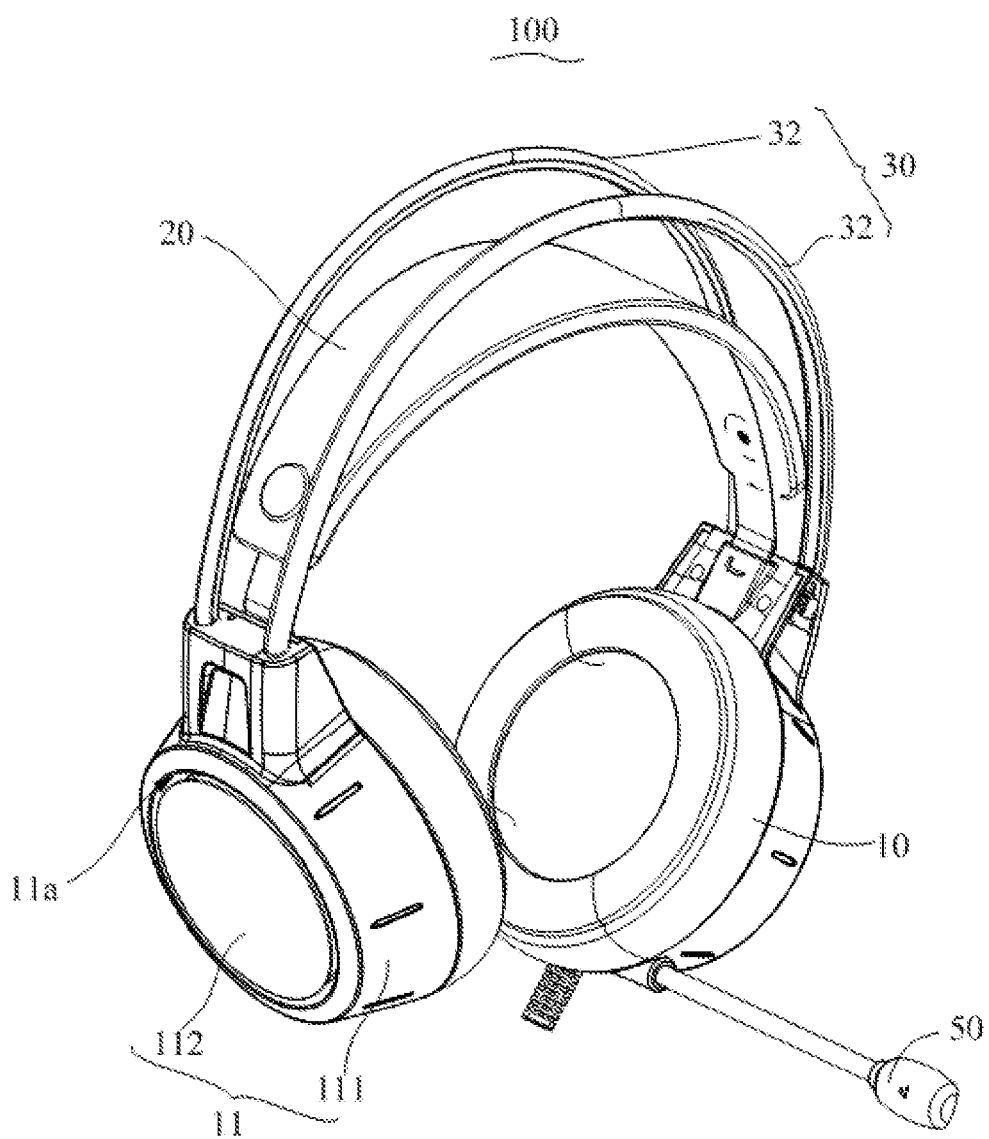
FIG. 1 is a schematic structural view of an embodiment of a headset of the present application.

The realization, functional features and advantages of the object of the present application will be further explained with reference to the accompanying drawings in connection with embodiments.

DETAILED DESCRIPTION OF THE EMBODIMENTS

The technical aspect of the embodiments of the present application will now be clearly and completely described in conjunction with the accompanying drawings of the embodiments of the present application, and it will be apparent that the described embodiments are only some of the embodiments of the present application, and not all of them. Based on the embodiments of the present application, all other embodiments obtained by those of ordinary skill in the art without creative work are within the claimed scope of the present application.

It should be noted that all directional indications (such as up, down, left, right, front, rear . . . ) in embodiments of the present application is only used to explain the relative positional relationship, motion, etc. between the components in a particular posture (as shown in the figure), and if the particular posture is changed, the directional indications will also change accordingly.

In the present application, unless it is expressly specified and defined, otherwise, the terms "connected", "fixed" and the like should be understood broadly, for example, "fixed" can be a fixed connection, a detachable connection, or an integral part. It can be a mechanical connection or an electrical connection. It can be directly connected or indirectly connected through an intermediate medium, and it can be an internal connection of two elements or an interaction between two elements, unless otherwise explicitly defined. The specific meanings of the above-mentioned terms in the present application can be understood by those of ordinary skill in the art according to the specific circumstances.

In addition, in the present application, descriptions such as "first", "second" and the like are used for descriptive purposes only, and cannot be understood as indicating or implying their relative importance or implying the number of indicated technical features. Thus, a feature defined as "first" and "second" may explicitly or implicitly include at least one such feature. In addition, the meaning of "and/or" appearing in the whole text is to include three parallel schemes, taking "A and/or B" as an example, it includes scheme A, scheme B, or both scheme A and B. In addition, the technical solutions between various embodiments can be combined with each other, but it must be based on the realization of those skilled in the art. When the combination of technical solutions contradicts or cannot be realized, it should be considered that such combination of technical solutions does not exist and is not within the claimed scope of the present application.

A headset 100 is provided in the present application.

According to FIG. 1, FIG. 2, FIG. 6, and FIG. 10, in an embodiment of the present application, the headset 100 includes two earplug components 10, a connecting member 20, a first light emitting component 30 and a second light emitting component 40. Each earplug component 10 includes an earphone shell 11 and a control device 12. The earphone shell 11 is defined with an accommodating cavity 1112, and the control device 12 is configured in the accommodating cavity 1112. The connecting member 20 connects the two earphone shells 11. The first light emitting component 30 includes a first light source 31 and a light emitting tube 32, the first light source 31 is configured in the accommodating cavity 1112 of at least one earphone shell 11 and is electrically connected to the control device 12, and two ends of the light emitting tube 32 are respectively connected to the two earphone shells 11. An optical adjusting member 33 is configured between the light emitting tube 32 and the first light source 31, and light emitted by the first light source 31 is transmitted to the light emitting tube 32 through the optical adjusting member 33. The second light emitting unit 40 is provided in the accommodating cavity 1112 and is electrically connected to the control device 12. A surface of one earphone shell 11 facing away from the other earphone shell 11 is defined with an emitting channel 11a communicating with the accommodating cavity 1112. Light emitted by the second light emitting unit 40 is emitted through the emitting channel 11a.

In particular, the earphone shell 11 can be made of plastic, and formed by injection molding, the structural strength is high and the processing is convenient. The connecting member 20 is connected to the two earphone shells 11, and the connection way between the connecting member 20 and the two earphone shells 11 may be a threaded connection, a plug connection, a snap connection, or the like, and is not limited here. A shape of the connecting member 20 is generally an arc-shaped line body, which conforms to a shape of a human head and is convenient to wear. Of course, in order to increase comfort, the connecting member 20 is made of an elastic material, which can increase a distance between the two earplug components 10 according to different requirements. Further, the connecting member 20 can be in an curved plate shape, so that a contact area with a head of a human body is increased and pressure on the head can be reduced. In addition, the connecting member 20 may also be configured as a length-adjustable structure. For example, the connecting member 20 includes a headband and two sliding rods slidably connected with the headband. The two sliding rods are fixedly connected with the earphone shells 11 correspondingly, thereby realizing different wearing lengths and widths for the headset, adapting to users with different head shapes and applicability is improved. Here, the description of the connecting member 20 is to facilitate understanding of the technical solution of the present embodiment, and the connecting member 20 is not limited to the above features. The first light emitting component 30 and the second light emitting component 40 are components for generating and transmitting light. It will be appreciated that the first light emitting component 30 and the second light emitting component 40 are also electrically connected to the control device 12, and the control device 12 can control the first light emitting component 30 and the second light emitting component 40 to generate light or not, and can control the frequency and color of light emission, etc.

The first light source 31 of the first light emitting component 30 may be an LED lamp bead, and the light emitting efficiency is high. The both ends of the light emitting tube 32 are connected to the two earphone shells 11 respectively, as a result, the first light source 31 is configured in the earphone shell 11, on the one hand, the first light source 31 can be protected, and on the other hand, the first light source 31 can be aligned with an end of the light emitting tube 32, and all the light emitted by the first light source 31 can enter the light emitting tube 32, thus utilization rate of light is improved. The light emitting tube 32 is a tube body emitting light when light passes through its interior. For example, the light emitting tube 32 is a transparent plastic tube and directly transmits light. In particular, there may be only one first light source 31, which is configured in one of the earphone shells 11, and the light is emitted to the other end through one end of the light emitting tube 32. Or, there may be two first light sources 31, and each earphone shell 11 is provided with one of the first light sources 31, the two first light sources 31 may emit lights at the same time, and the lights are emitted from both ends of the light emitting tube 32 at the same time, and mixed and interacted in a middle part of the light emitting tube 32, and more gorgeous interactive light is formed through interference and diffraction of lights. The two first light sources 31 may alternately emit light to achieve better visual perception.

Figure 3:
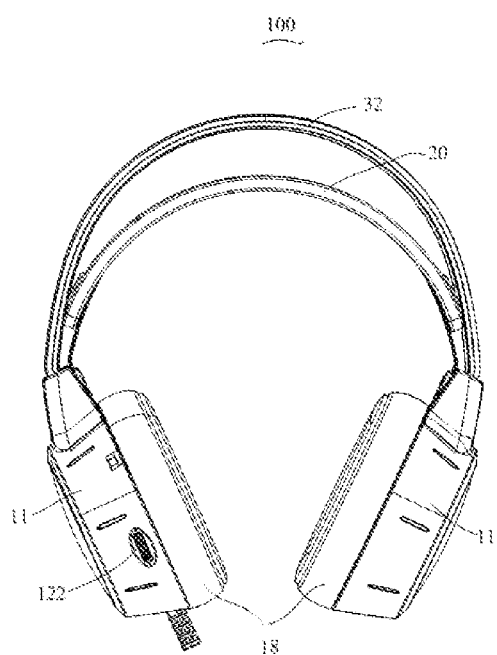
FIG. 3 is a front view of the headset of FIG. 1.
Figure 4:
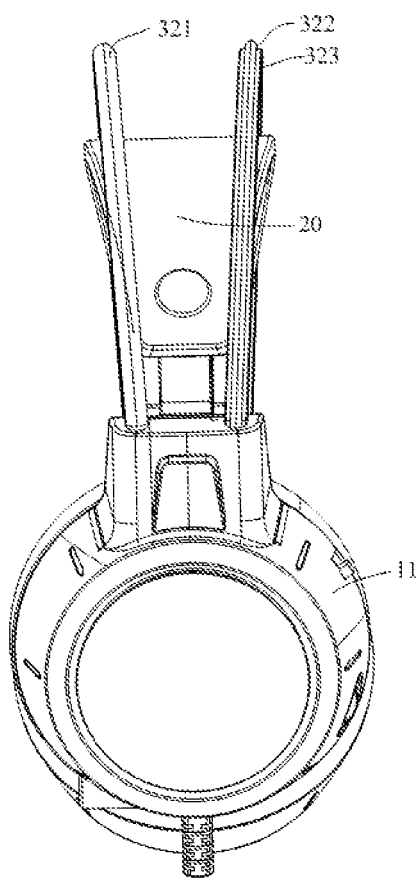
FIG. 4 is a left side view of the headset of FIG. 1.

Of course, referring to FIG. 3 and FIG. 4, the light emitting tube 32 may be configured above the connecting member 20, which refers to a side of the connecting member 20 facing away from the earplug component 10, so that the light emitting tube 32 does not play a supporting role and only has a decorative or warning light emitting effect. In particular, the optical adjusting member 33, which may be a light guiding plate 42, a convex lens, a concave lens, a prism, or the like, is configured between the first light source 31 and the light emitting tube 32. The optical adjusting member 33 may be provided in accordance with the position of the first light source 31, so that the light emitted from the first light source 31 can be adjusted to be directed to the light emitting tube 32 at a better angle or more intensively.

The emitting channel 11a of the earphone shell 11 may be of a linear type, a pattern type, a ring shape, a polygonal shape, or the like, and may be set according to actual needs so as to ensure the light emitted from the second light emitting unit 40 can be emitted out of the accommodating cavity 1112.

The headset 100 of the technical schemes of the present application includes two earplug components and a connecting member 20. The two earplug components 10 each includes an earphone shell 11 and a control device 12 configured in the earphone shell 11. The connecting member 20 is connected to the two earphone shells 11 to play a role of connecting and supporting, so that the two earplug members 10 are fixed to two ears. At the same time, the headset 100 further includes a first light emitting component 30 and a second light emitting component 40, which emit lights from multiple directions, thereby increasing light emitting area, enhancing the light emitting effect, and meeting needs of users. Secondly, the first light emitting component 30 includes a first light source 31, a light emitting tube 32, and an optical adjusting member 33. The first light source 31 is configured in the earphone shell 11 and is electrically connected to the control device 12. The first light source 31 emits light under a control of the control device 12. The light is emitted to an end of the light emitting tube 32 through the optical adjusting member 33, so that the light emitting tube 32 lights as a whole. The light emitting tube 32 is located at a top of the head, which not only increase the light emitting area, but also make it more eye-catching. At the same time, the light emitted from the light source may be adjusted by the optical adjusting member 33 so that it is emitted to the light emitting tube 32 at a better angle or being more concentrated, thus effectively improving the utilization rate of light and the light emitting effect. In addition, the second light emitting component 40 is configured in the accommodating cavity 1112, and an outer surface of the earphone shell 11 is defined with an emitting channel 11a communicating with the accommodating cavity 1112. The light emitted by the second light emitting component 40 is directly emitted through the emitting channel 11a, so that the outer surface of the earphone shell 11 produces a light emitting effect without passing through a light transmitting member, thereby achieving higher light transmittance and brightness, and significantly improving the light emitting effect.

In addition, in order to increase functionality, referring to FIG. 1, the headset 100 may further include a microphone 50, which is an energy conversion device that converts a sound signal into an electrical signal for picking up sound and can realize an audio receiving function, thereby realizing interactive processing of the audio signal. The microphone 50 is configured on an outer side of one of the earplug component 10, and is extended a distance from an outer surface of the earphone shell 11 through a connecting rod. An end of the connecting rod is provided with a sound hole corresponding to a position of the microphone 50, so that the microphone 50 is directly facing a mouth of a user, improving pickup efficiency.

And for comfort, each earplug component 10 may also include an earplug pad 18 mounted on an inner surface of the earphone shell 11. The inner surface of the earphone pad 18 refers to a surface facing the other earphone shell 11. The material of the earphone shell 11 may be sponge, silica gel, rubber, etc., which is with flexibility. The earplug pad 18 is in direct contact with the user's ear, so that the hard earphone shell 11 is prevented from contacting the human body, thereby reducing press on the human ear, reducing the vibration energy of audio signals to a certain extent, and improving protection.

Figure 5:
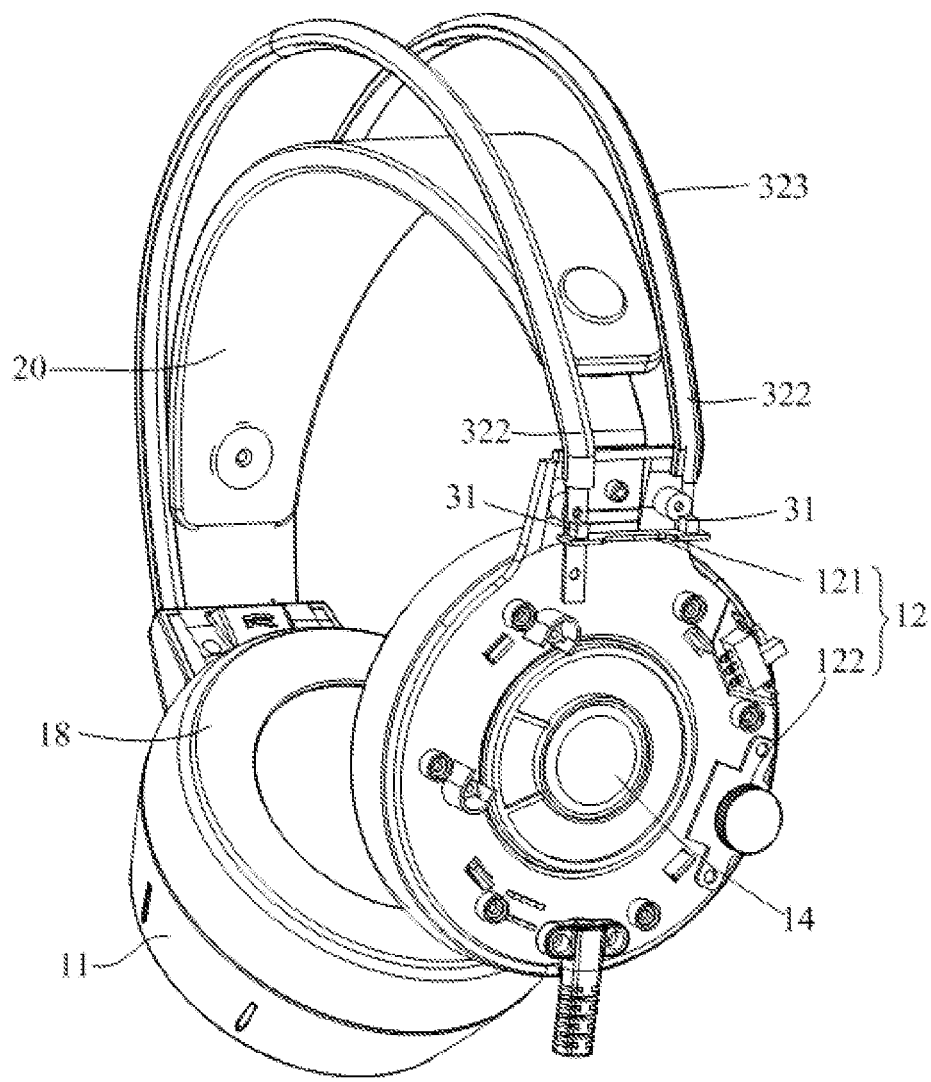
FIG. 5 is a schematic structural view of an embodiment of a first light emitting component and a control device of the headset of FIG. 1.
Figure 6:
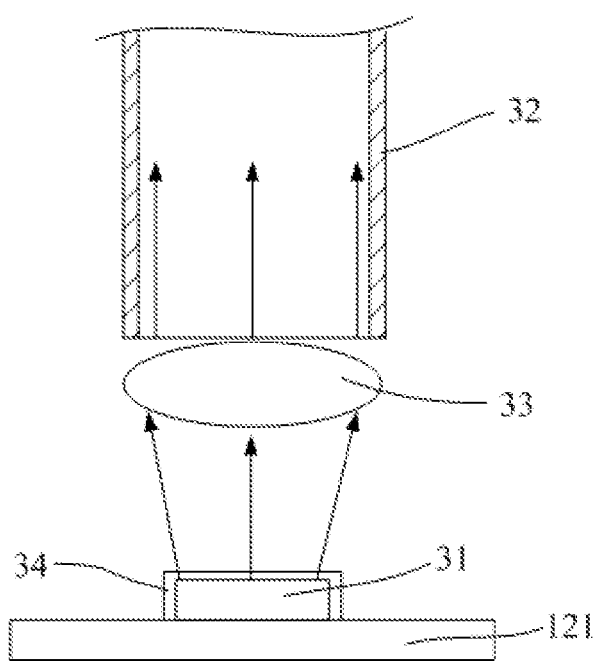
FIG. 6 is a schematic diagram of the first light emitting component and the control device in an embodiment of the headset of the present application.
Figure 7:
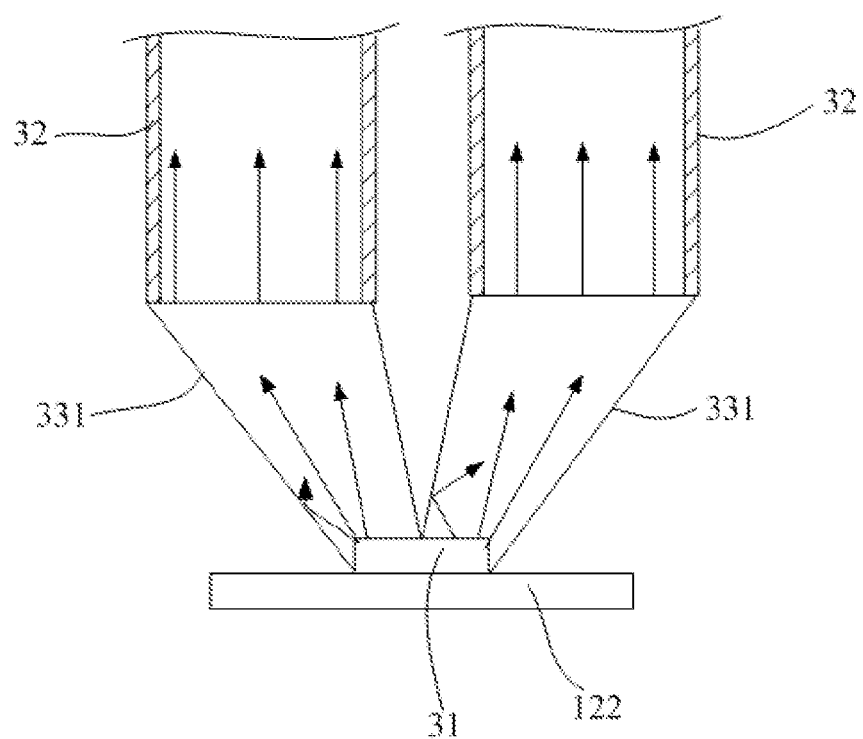
FIG. 7 is a schematic diagram of an embodiment of the first light emitting component and the control device in the headset of FIG. 1.

Furthermore, the specific structure of the first light emitting component 30 will be explained. Referring to FIGS. 5 to 7, in order to better concentrate light into the light emitting tube 32, in an optional embodiment, the control device 12 includes a circuit board 121, the first light source 31 is configured on the circuit board 121, and the optical adjusting member 33 is a convex lens.

In this embodiment, the control device 12 includes a circuit board 121, the circuit board 121 is connected with the earphone shell 11 through threads which is a stable connection structure, so that an effect of controlling light emission can be guaranteed. Of course, the circuit board 121 may also be connected to the earphone shell 11 by means of snap-up, adhesion, or the like. The first light source 31 is configured on the circuit board 121, and a connection mode between the first light source 31 and the circuit board 121 can be gluing or soldering, so that it is convenient to assemble outside the earphone shell 11, thereby reducing parts needed in the integral assembly of the headphone 100 and improving production efficiency. At the same time, a direct connection of the two can also save space and reduce wires needed, thereby making a compact structure and reserving space for an arrangement of the optical adjusting member 33. Of course, a power supply may be configured on the circuit board 121 to supply electric energy. A charging interface may be provided to supply power to the headset 100 through an external power supply, and is not limited here. In particular, the optical adjusting member 33 is a convex lens, and the convex lens converges the light and reduces the degree of light divergence of the first light source 31, so that even when a distance between the first light source 31 and the light emitting tube 32 is fixed, a utilization rate of light can be improved and the light emitting effect can be ensured. The convex lens may be biconvex, plano-convex, concave-convex or the like, and is not limited here.

It can be understood that the control device 12 also includes a control key 122, which is mounted on the earphone shell 11 and exposed or semi-exposed on the surface of the earphone shell 11, and is convenient for users to operate. The control key 122 is electrically connected to the circuit board 121, so that different light emitting modes are changed by pressing the control key 122. For example, the first light source 31 can be automatically triggered when the headset 100 plays sound, so that the light emitting tube 32 continuously emits light. When the control key 122 is pressed for different times, the continuous light emission is changed into intermittent light emission, and a duration of the intermittent light emission is continuously changed until the first light source 31 is turned off. Of course, when the headset 100 is not operating, the first light source 31 may be triggered by pressing the control key 122, and the light emitting mode may be changed by the number of times the control key 122 is pressed. Of course, the control key 122 may be in the form of a knob or a touch, and is not limited here.

Further, the first light source 31 is located at a focus position of the optical adjusting member 33, and the optical adjusting member 33 is attached to an end of the light emitting tube 32. In particular, in order to minimize a divergence degree of light passing through the optical adjusting member 33, the first light source 31 is arranged at the focal position of the optical adjusting member 33, therefore, lights emitted from the first light source 31 pass through the optical adjusting member 33 and enter the light emitting tube 32 in parallel and parallel to an end extension line of the light emitting tube 32, thereby further improving a light utilization rate of the first light source 31 and ensuring that the light enters smoothly from the end of the light emitting tube 32. At the same time, since a shape of the light emitting tube 32 is also substantially arcuate, refraction or reflection occurs continuously during light transmission, so that luminance in the middle part of the light emitting tube 32 is relatively high. Therefore, a gradual light emitting effect is formed in a direction from the end to the middle part of the light emitting tube 32. In particular, the optical adjusting member 33 may be attached to the end of the light emitting tube 32, and an optional convex lens type is plano-convex, which is convenient to be connected with the end of the light emitting tube 32, further compacting the structure and saving space in the earphone shell 11.

Figure 8:
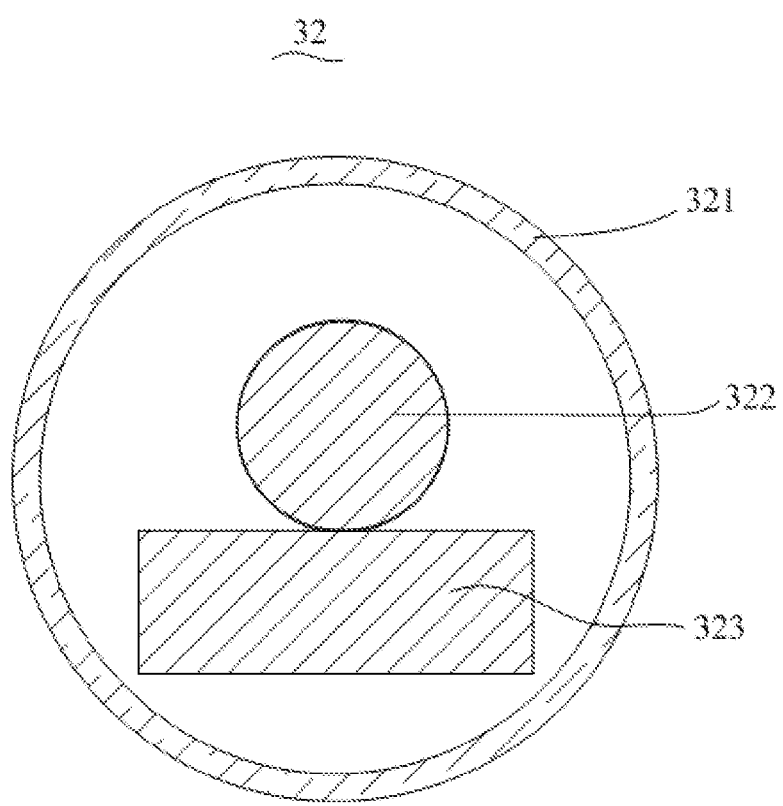
FIG. 8 is a cross-sectional view of an embodiment of a light emitting tube of a second light emitting component of the headset of FIG. 1.
Figure 9:
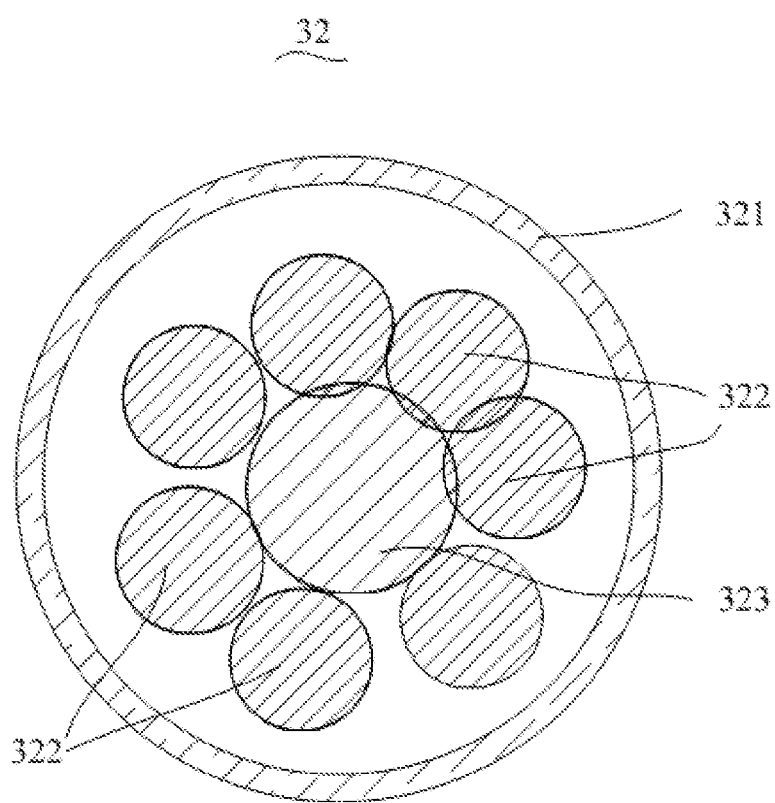
FIG. 9 is a cross-sectional view of another embodiment of the light emitting tube of the second light emitting component of the headset of FIG. 1.
Figure 10:
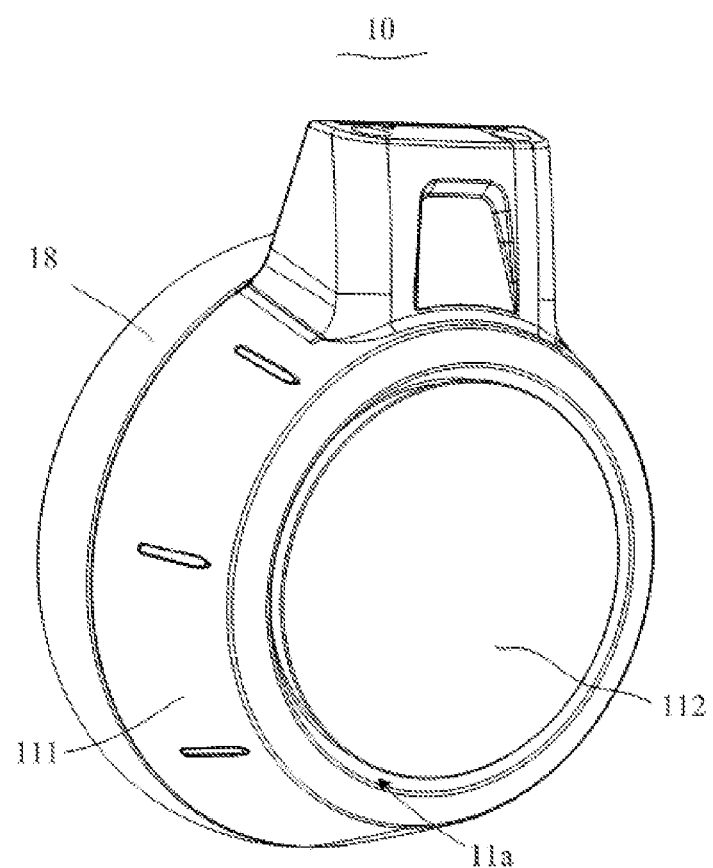
FIG. 10 is a schematic structural view of the earplug component of the headset of FIG. 1.

Optionally, referring to FIGS. 8 and 9, the cross section of the light emitting tube 32 is circular, and a height of the optical adjusting member 33 is the same as an inner diameter of the light emitting tube 32. The cross section of the light emitting tube 32 may be rectangular, circular, polygonal, or the like, and is not limited here. When the cross section of the light emitting tube 32 is circular, the light emitting tube 32 is circular. Therefore, the optical adjusting member 33 is a convex lens, and its height is a distance between two tips of the convex lens, and matches the inner diameter of the light emitting tube 32, thereby ensuring that all light passing through the convex lens enters the light emitting tube 32, and further improving the utilization rate of light. Of course, when the cross section of the light emitting tube 32 is rectangular or polygonal, the height of the optical adjusting member 33 may be matched with a maximum size of the cross section of the light emitting tube 32 to ensure a smooth entry of light. In this embodiment, the first light source 31 may be located at the focus position of the optical adjusting member 33, or it may be set separately.

In order to further increase the light emitting area, in an optional embodiment, two light emitting tubes 32 are provided, the two light emitting tubes 32 are configured at intervals, and two ends of the two light emitting tubes 32 are respectively connected to the two earphone shells 11.

In this embodiment, two light emitting tubes 32 are provided, the two light emitting tubes 32 are configured in parallel and at intervals, and two ends of each light emitting tube 32 are respectively connected with the two earphone shells 11. Therefore, both the two light emitting tubes 32 emit lights, which increases the light emitting area of the first light emitting component 30. More light emitting modes may be realized through simultaneous light emitting or alternate light emitting of the two light emitting tubes 32, and the light emitting effect can be improved. In particular, shapes and lengths of the two light emitting tubes 32 are the same, which facilitates mass production and saves processing cost. Of course, the two light emitting tubes 32 may be different. Or, there may be three or more light emitting tubes 32, so that the light emitting area can be further increased. Of course, there should not be too many light emitting tubes 32.

Further, the first light source 31 is located on a center line of a line connecting two adjacent ends of the two light emitting tubes 32, and the optical adjusting member 33 includes two mirror barrels 331. An end of one mirror barrel 331 is communicated with an end of one of the light emitting tubes 32, and the other end of the mirror barrel 331 half covers the first light source. In this embodiment, when there is only one light source, the light source is configured on the center line of the line connecting the two ends of the two light emitting tubes 32 in order to give consideration to light emitted by the two light emitting tubes 32, so that the light emitted by the light source may uniformly enter the two light emitting tubes 32, and the amount of light of the two light emitting tubes 32 is guaranteed.

Of course, in order to simultaneously improve the utilization rate of light of the first light source 31, the optical adjusting member 33 includes two mirror barrels 331, an inner surface of each mirror barrel 331 is a reflective surface, one end of each mirror barrel 331 covers the first light source 31 and covers half of the area of the first light source 31. When light emitted from the first light source 31 enters the mirror barrel 331, the light can be transmitted to the other end of the mirror barrel 331 by reflection of the reflective surface, thereby entering the light emitting tube 32 to emit light. In this way, all the light from the first light source 31 are utilized and transported to the two light emitting tubes 32 respectively, so that the utilization rate of light is improved to the maximum extent and the light emitting effect is ensured. Specifically, when the first light source 31 is a hemispherical lamp bead, a cross-sectional shape of the mirror barrel 331 may be set to be circular, and a plane where the end of the mirror barrel 331 connected to the first light source 31 is not perpendicular to its axial direction, so as to match with and cover the first light source 31 better.

In an optional embodiment, two first light sources 31 are provided, each of the first light sources 31 corresponds to one light emitting tube 32, and the optical adjusting member 33 is a convex lens.

In this embodiment, two first light sources 31 are provided, that is, the first light sources 31 and the light emitting tubes 32 are in a one-to-one correspondence relationship. At this time, when the optical adjusting member 33 is a convex lens (not shown), a configuration relationship of the first light sources 31 and the optical adjusting member 33 may refer to a configuration setting of one first light source 31 and one light emitting tube 32 described above, and will not be described here.

In addition to the optical adjusting member 33, in an optional embodiment, the first light emitting component 30 further includes two light masks 34, with one light mask 34 covering one first light source 31.

In this embodiment, in order to further ensure luminous efficiency of the first light sources 31, the first light emitting component 30 further includes two light masks 34, each of which covers one of the first light sources 31. The light masks 34 may better concentrate light or soften the light to avoid dazzling light from the light emitting tube 32. Light transmittance of the masks 34 must be within a certain range, so that light energy is not wasted too much in the masks 34, and the light can be radiated out to a maximum extent. The masks 34 can be made of a material such as PC or glass with good light transmittance and heat resistance, and their shape may match a shape of the first light sources 31, thereby significantly improving the utilization rate of light of the first light source 31. Of course, when only one first light source 31 and only one light emitting tube 32 are provided, a mask 34 may be provided to cover the first light source 31, improving the light emitting effect.

On the basis of all the above embodiments, in an optional embodiment, referring to FIGS. 4, 8 and 9, the light emitting tube 32 includes a light transmitting tube 321, an optical fiber 322 provided in the light transmitting tube 321, and a supporting member 323. The optical fiber 322 is provided at a periphery of the supporting member 323.

In this embodiment, the light emitting tube 32 includes a light transmitting tube 321 and an optical fiber 322. The optical fiber 322 is short for light-guide fibre. The optical fiber 322 may be made of glass or plastic. As a light transmission member, it can realize total reflection of light and reduce light loss. The light transmitting tube 321 may be made of polyvinyl chloride (PVC) or plexiglass, which has good light transmitting performance. The optical fiber 322 is provided in the light transmitting tube 321, so that more optical interference effects and diffraction effects are generated when light enters the light transmitting tube 321, thereby generating more color changes and improving the luminous effect.

At the same time, because the optical fiber 322 is relatively soft, in order to support the optical fiber 322 to a certain extent, the light emitting tube 32 also includes a supporting member 323. The supporting member 323 can be made of steel, such as stainless steel. A cross-sectional shape of the supporting member 323 may be rectangular or circular, and is not limited here. The optical fiber 322 is provided on a periphery of the supporting member 323, and the supporting member 323 can support the optical fiber 322, and an overall strength of the light emitting tube 32 is also improved, thereby effectively prolonging a service life of the light emitting tube 32. Specifically, the optical fiber 322 may be disposed on a side of the supporting member 323 facing away from the connecting member 20, so that the variable color generated by light passing through the optical fiber 322 can be directly emitted out, and the luminous effect can be effectively improved.

In an optional embodiment, a plurality of optical fibers 322 are provided. the plurality of optical fibers 322 are wound.

Or, the plurality of optical fibers 322 are configured around the supporting member 323.

In particular, in order to further enhance a transmission rate of light, the plurality of optical fibers 322 are provided, and the plurality of optical fibers 322 may be directly wound with each other to form a bundle of optical fibers 322 with a larger diameter. As such, an arrangement of the plurality of optical fibers 322 can increase reflection and refraction of light, further increasing brightness of light.

Of course, in another embodiment, the plurality of optical fibers 322 may be wound around the supporting member 323, so that a bundle of optical fibers 322 with a larger diameter can be formed by using fewer optical fibers 322, and the reflection and refraction of light can be increased. At the same time, light can be emitted in all directions of the light transmitting tube 321, and the light emitting effect of the light emitting tube 32 can be further improved.

Next, a specific structure of the second light emitting module 40 will be explained.

Referring to FIGS. 10 to 13, in an embodiment of the present application, each earphone shell 11 includes a body 111 and a cover plate 112. The body 111 forms the accommodating cavity 1112 and is defined with a mounting opening 1111 communicated with the accommodating cavity 1112. The cover plate 112 covers the mounting opening 1111, and an edge of the mounting opening 1111 and the periphery of the cover plate 112 enclose to form an emitting channel 11a.

In this embodiment, to facilitate the assembly of the second light emitting component 40, each earphone shell 11 is provided with a body 111 and a cover plate 112. The body 111 forms the accommodating cavity 1112 and a mounting opening 1111 communicating with the accommodating cavity 1112. A shape of the mounting opening 1111 may be square, circular, polygonal, or the like. A shape of the cover plate 112 is matched with the mounting opening 1111 to define the required emitting channel 11a, which not only achieves the luminous effect, but also prevents the emitting channel 11a from being too large and reduces the falling in of dust. Of course, the emitting channel 11a can be formed by a portion of the periphery of the cover plate 112 and a portion of the periphery of the mounting opening 1111, or the emitting channel 11a can be formed by the entire periphery of the cover plate 112 and the entire periphery of the mounting opening 1111, and is not limited here. Moreover, a connection of the cover plate 112 and the body 111 can be a threaded connection, so that the connection structure has high strength to improve the structural stability. Of course, the connection of the two can also be a snap connection or a plug connection.

Further, the emitting channel 11a is annular.

And/or, the emitting channel 11a is in an arcuate shape in a direction from the accommodating cavity 1112 to outside.

In particular, in one embodiment, in order to increase the luminous area, the emitting channel 11a is configured in an annular shape, that is, the peripheral edge of the cover plate 112 and the entire periphery of the mounting opening 1111 enclose to form the emitting channel 11a. On an outer surface of the earphone shell 11, the emitting channel 11a is annular, so that when light is emitted, an annular halo is formed, the light emitting area is large, light emitting brightness is improved and light emitted is more brilliant as not being blocked by a light transmitter. In particular, the emitting channel 11a may be a circular, which conforms to an overall appearance shape of the earphone shell 11, thereby increasing the light emitting area, and improving the light emitting effect. Of course, in other embodiments, the emitting channel 11a may be square or polygonal.

Since the emitting channel 11a is annular, in order to make the appearance more beautiful, the emitting channel 11a has an arc shape in the direction from the accommodating cavity 1112 to outside, that is, an inner surface of the emitting channel 11a is an arc surface. Therefore, when the emitting channel 11a is viewed from the outside, it is possible to avoid directly seeing internal components, and effectively improving aesthetics of the earphone shell 11. At the same time, the arc inner surface can also make the light reflect and refract more, making emitted light softer and providing different types of luminous effects. Of course, in order to reduce a loss of light on the inner surface, it is also possible to coat a reflective surface or provide a member such as an optical fiber 322 in the emitting channel 11a, thereby ensuring transmission energy of light, reducing the loss, ensuring brightness of exit light, and making the annular light halo of the earphone shell 11 more brilliant and eye-catching.

In an optional embodiment, a surface of the cover plate 112 is provided with a light-transmitting area (not shown).

In this embodiment, a surface of the earphone shell 11 has a light emitting effect through the emitting channel 11a. At the same time, in order to further increase the light emitting area, the surface of the cover plate 112 is also provided with a light transmitting area. When the second light emitting component 40 emits light, the light may not only emit through the emitting channel 11a, but also emit through the light transmitting area, further increasing an area and diversity of the light emitted, and effectively improving a decorative effect and overall aesthetics of the earphone shell 11.

In an optional embodiment, the cover plate 112 is made of a light-transmitting material, the surface of the cover plate 112 is coated with a light-shielding layer, and a portion of the cover plate 112 that is not coated with the light-shielding layer is the light-transmitting area.

In this embodiment, the cover plate 112 is made of a light-transmitting material, such as polyvinyl chloride (PVC), with good structural stability. In order to facilitate processing, a light shielding layer is coated on the surface of the cover plate 112, and the light shielding layer can block light from passing through, making the cover plate 112 opaque. On this basis, a portion of the light shielding layer is removed by laser engraving, so that the light transmitting area with a certain pattern is formed, and the light emitted by the second light emitting component 40 forms a light emitting effect with a specific pattern after being emitted, and the appearance is more beautiful. Moreover, the laser engraving makes the pattern more exquisite and ensures a light emitting range and effect.

Of course, in other embodiments, a central region of the cover plate 112 may be hollowed out to form the light-transmitting region, so that light directly passes through the hole-shaped light-transmitting region, reducing a loss of light, further improving brightness of light, and improving a luminous effect of the cover plate 112. On this basis, optionally, a material of the cover plate 112 is an opaque material to prevent the light emitting area from being inconspicuous due to friction between the light and the light shielding layer, and to ensure that other parts except the light transmitting area can effectively block the light.

Figure 2:
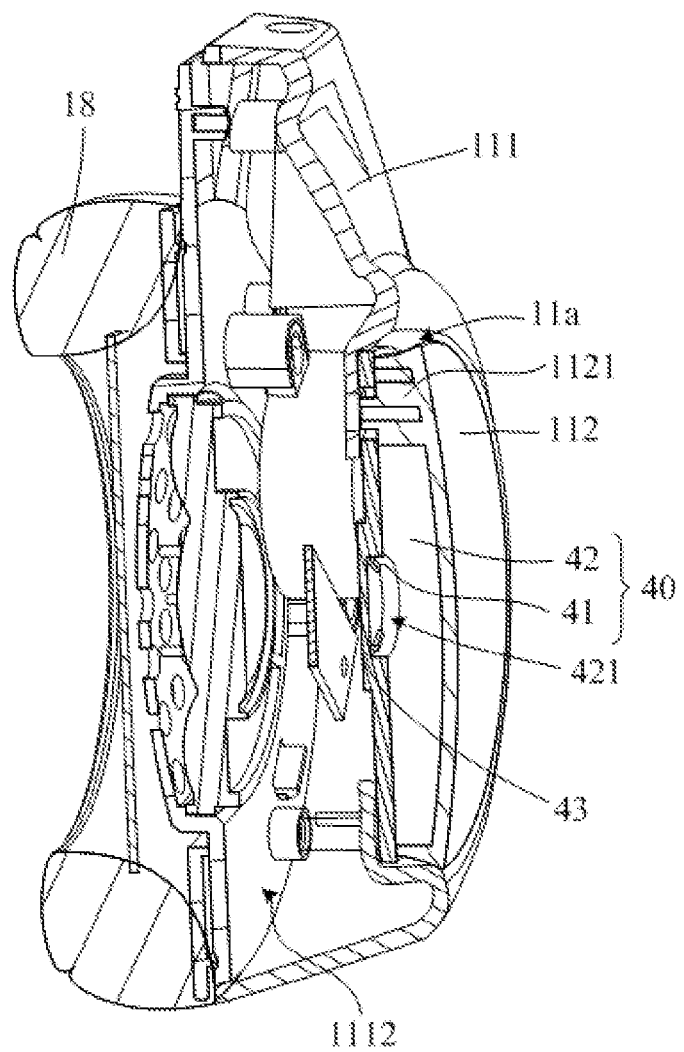
FIG. 2 is a schematic sectional view of an earplug component of the present application.
Figure 11:
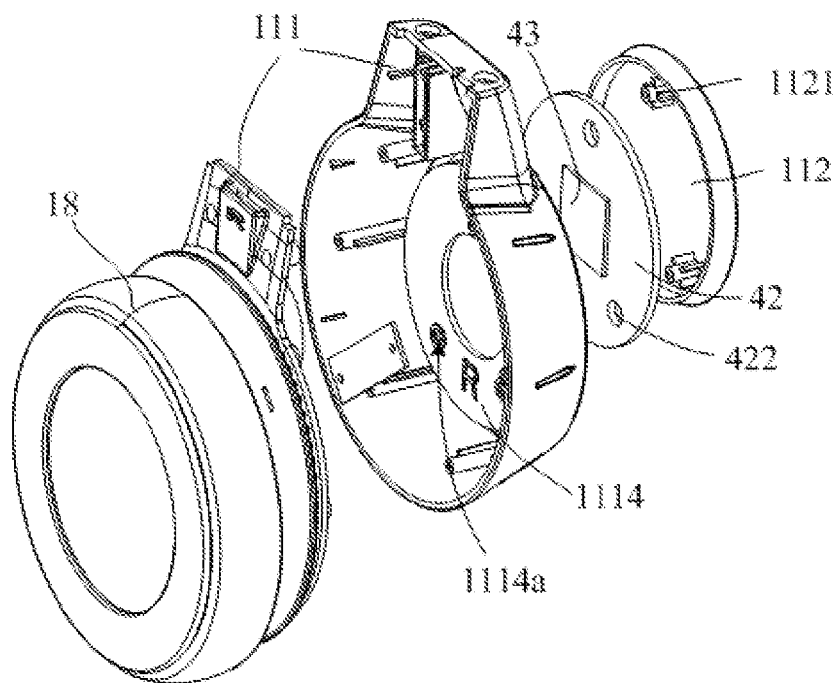
FIG. 11 is an expanded view of the earplug component of FIG. 10 from a perspective.
Figure 12:
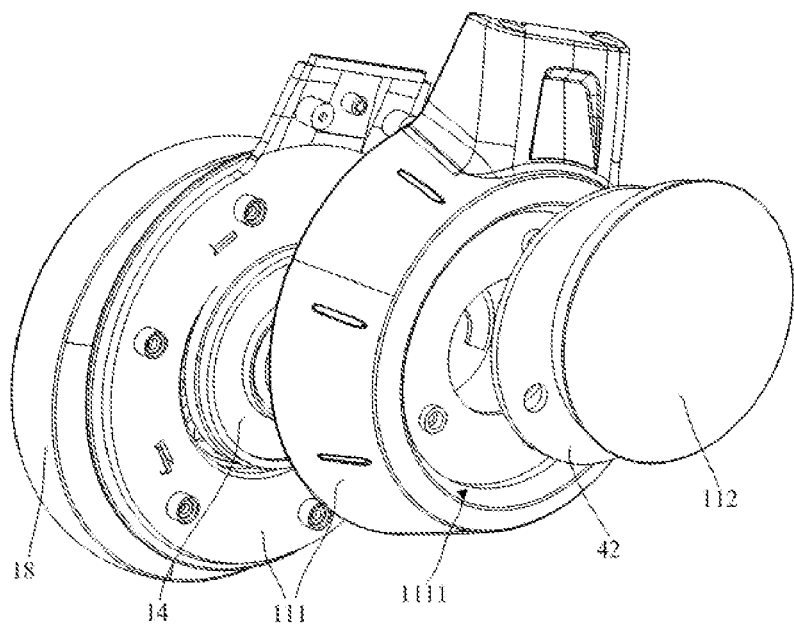
FIG. 12 is an expanded view of the earplug component of FIG. 10 from another perspective.

Optionally, referring to FIGS. 2 and 11, the second light emitting component 40 includes a second light source 41 and a light guide plate 42, both of which are mounted on the body 111, and light emitted by the second light source 41 is emitted to the emitting channel 11a after passing through the light guide plate 42.

In this embodiment, the second light emitting component 40 includes a second light source 41, which may also be an LED lamp bead and has high luminous efficiency. In particular, there may be one second light source 41 or two or more second light sources 41, and the second light source(s) is(are) electrically connected to the control device 12 so as to emit light under a control of the control device 12. Optionally, the control device 12 is a circuit board 121 to which the second light source 41 can be electrically connected through wires. In order to make the light emitted from the second light source(s) 41 emit from a desired position, the light from the second light source(s) 41 may be guided by the light guide plate 42, improving light transmission efficiency. Specifically, the second light source(s) 41 and the light guide plate 42 may be in a side entry mode, that is, the second light source(s) 41 is(are) located on a side peripheral surface of the light guide plate 42, and the light guide plate 42 guides light from one side to the other, so that a larger light emitting area can be obtained with fewer second light sources 41.

In an optional embodiment, in order to have a circular halo of light, the light guide plate 42 is sandwiched between the body 111 and the cover plate 112, one end of the emitting channel 11a is abutted by a peripheral edge of the light guide plate 42, the light guide plate 42 is defined with a center hole 421, and the second light source(s) 41 is(are) provided in the center hole 421. Specifically, the cover plate 112 includes a plate body, and a side plate provided at a periphery of the plate body, a mounting column 1121 is provided on an inner surface of the plate body, a mounting plate 1114 is formed on an inner surface of the mounting opening 1111 of the body 111, the mounting plate 1114 is provided with a mounting hole 1114a, the light guide plate 42 is provided with a connecting hole 422 at a position corresponding to the mounting column 1121, and the mounting column 1121 is partially inserted into the connecting hole 422 and the mounting hole 1114a and fixedly connected by fasteners. A plurality of mounting columns 1121 may be configured, and the plurality of mounting columns 1121 are evenly distributed on the surface of the plate body, realizing stability and uniformity of the connection structure. Therefore, the light emitted from the second light source(s) 41 is emitted to the inside of the light guide plate 42 from the inner surface of the center hole 421, and is reflected and refracted a plurality of times on the surfaces of the light guide plate 42, so that it reaches an edge position of the light guide plate 42, and is emitted through the emitting channel 11a. In particular, a size of the light guide plate 42 may be configured according to a size of the annular shape formed by the emitting channel 11a, so that to ensure the light to incident into the emitting channel 11a and improve the utilization rate of light of the second light source(s) 41.

Of course, in other embodiments, the second light source 41 may be a direct light emitting mode, that is, the second light source 41 is located below a surface of the light guide plate 42.

In order to further improve the utilization rate of light, in an optional embodiment, the second light emitting component 40 further includes a reflective plate 43. The reflective plate 43 is provided on a surface of the light guide plate 42 facing away from the cover plate 112, and the second light source(s) 41 is(are) mounted on the reflective plate 43.

And/or, the surface of the light guide plate 42 facing away from the cover plate 112 is provided with a protrusion.

In particular, a reflective plate 43 is provided on the surface of the light guide plate 42 facing away from the cover plate 112, and the second light source(s) 41 is(are) located in the center hole 421, so that it can be mounted on the reflective plate 43, thereby facilitating fixing and maintaining structural stability. In particular, the reflective plate 43 may be attached to the surface of the light guide plate 42, or the reflective plate 43 and the light guide plate 42 can be integrated to one, so that light is prevented from leaking out of a gap between the light guide plate 42 and the reflective plate 43, and the utilization rate of light is maximized. In particular, three second light sources 41 are provided, and the three second light sources 41 are fixed on one plate and uniformly distributed in the center hole 421, so that the luminance in the emitting channel 11a is improved. In order to avoid interference, an avoidance hole is formed in a middle of the mounting plate 1114 of the body 111, and the reflective plate 43 can be located in the avoidance hole. The reflective plate 43 can reflect all the light from the light sources to the emitting channel 11a or the cover plate 112, thereby the effective utilization rate of light is effectively improved.

At the same time, a plurality of protrusions may be provided on the surface of the light guide plate 42. The protrusions may be made by screen printing. The plurality of protrusions have a same size and are evenly distributed on the surface of the light guide plate 42, so that the reflection probability can be increased through the protrusions, uniformity in the light transmission process may be effectively improved, and light uniformity can be improved, so that brightness of each part of the annular halo is guaranteed to be the same, and the luminous effect is improved. Of course, it is also possible to provide concave points on the surface of the light guide plate 42, or fill the light guide plate 42 with light-homogenizing powder, bubble points, etc., so as to achieve a better optical effect.

In addition, a brightness enhancement film, such as a prism sheet or a reflective polarizer, can be added between the light guide plate 42 and the reflective plate 43, so that the brightness and luminous efficiency of light emitted from the emitting channel 11a is improved, and the light emitting effect is effectively guaranteed.

In order to improve uniformity of light emission, in an optional embodiment, when the surface of the cover plate 112 is provided with the light-transmitting area, the second light emitting component 40 further includes a light-homogenizing plate (not shown), which is provided between the light guide plate 42 and the cover plate 112. The light of the second light source(s) 41 passes through the light guide plate 42 and then passes through the light-homogenizing plate to the light-transmitting area.

In this embodiment, a light-homogenizing plate can be provided between the light guide plate 42 and the cover plate 112, and the material of the light-homogenizing plate can be Polymethyl methacrylate (PMMA) acrylic material, polyvinyl chloride, or the like, which is not limited here, thereby uniformly dispersing the light and ensuring uniformity of the light emitted to the light transmission region.

Figure 13:
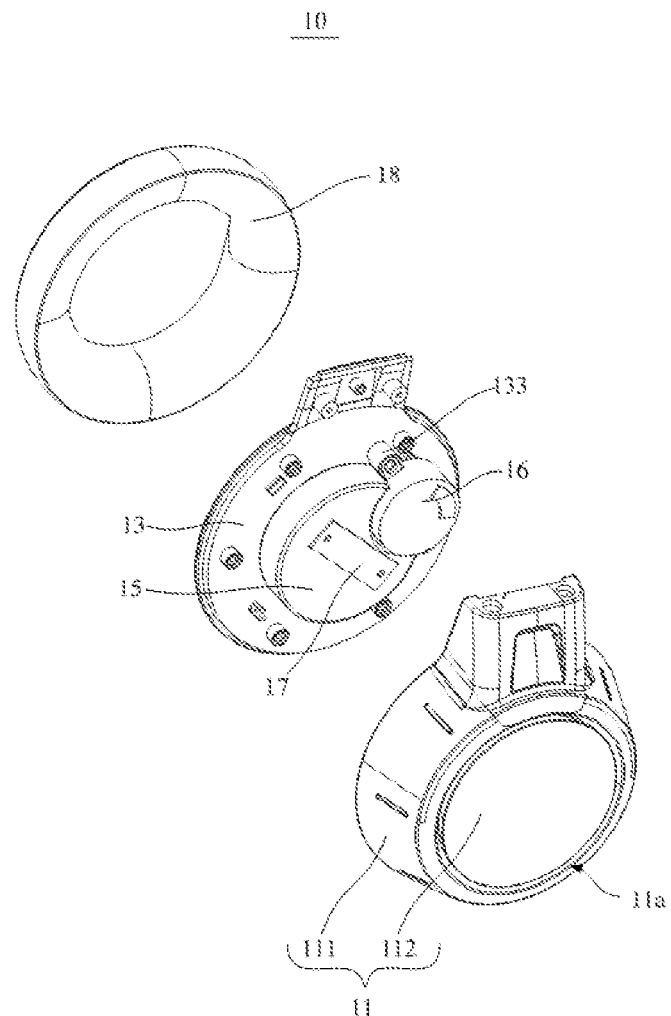
FIG. 13 is a schematic view of an assembly structure of the earplug component of the headset of the present application.
Figure 14:
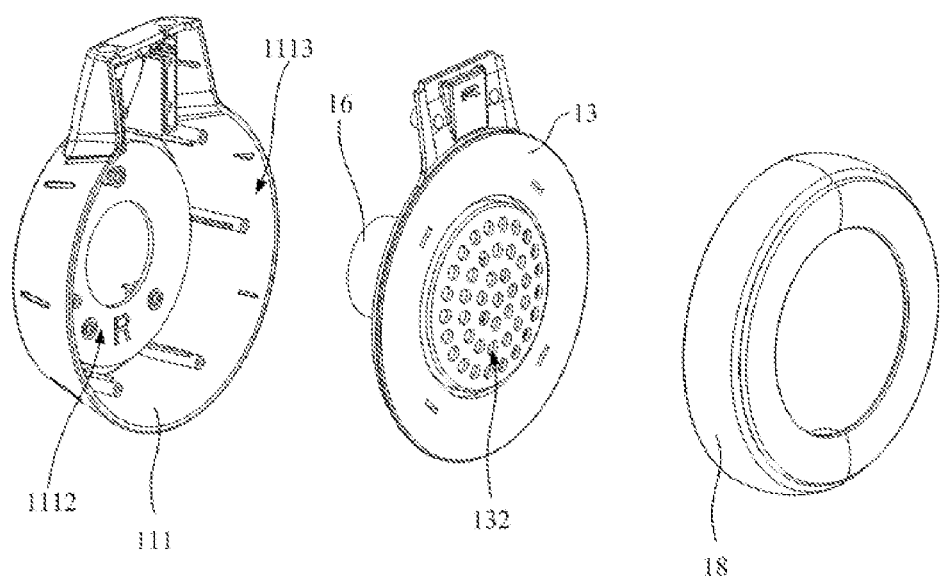
FIG. 14 is a schematic view of the assembly structure of the earplug component of the headset of the present application from another perspective.
Figure 15:
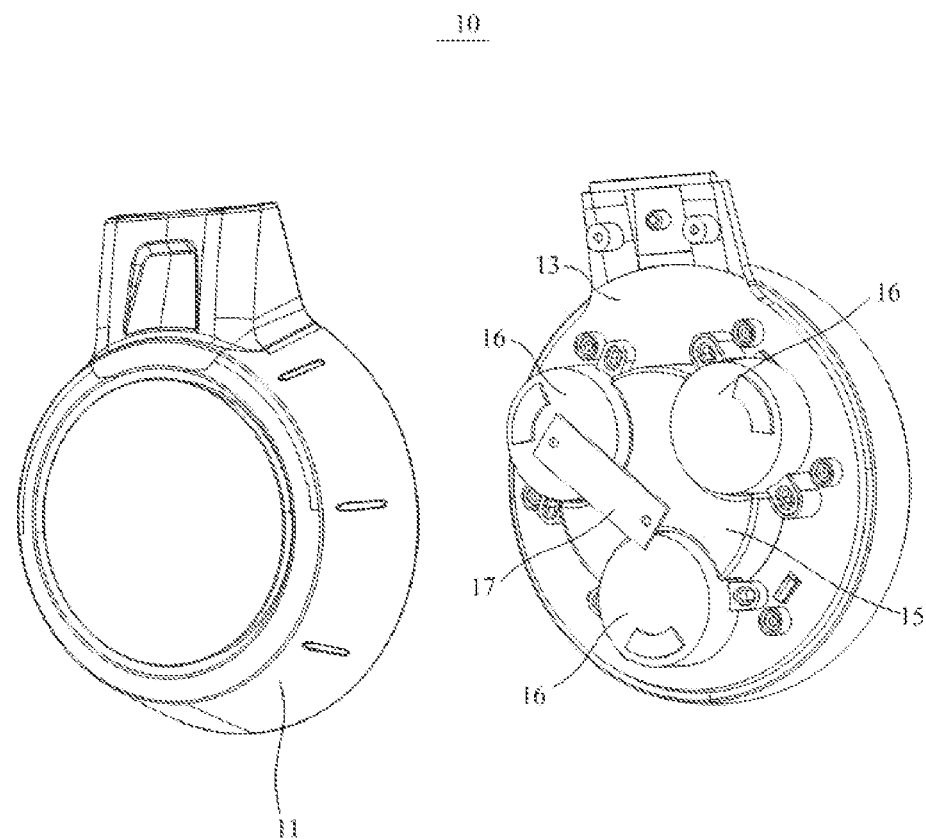
FIG. 15 is a schematic view of an assembly structure of another embodiment of the earplug component of the headset of the present application.

In one embodiment of the present application, referring to FIGS. 13 to 15, an opening 1113 communicating with the accommodating cavity 1112 is formed on a side of the body 111 facing away from the mounting opening 1111. Each earplug component 10 further includes a supporting frame 13, a speaker 14, and a sound chamber cover 15. The supporting frame 13 is connected to the body 111 and covers the opening 1113, and the supporting frame 13 is defined with a sound exit hole 132. The speaker 14 is connected to the supporting frame 13 and located in the accommodating cavity 1112. The sound chamber cover 15 is located in the accommodating cavity 1112, and encloses the supporting frame 13 to form a sound chamber, and the sound exit hole 132 is communicated with the sound chamber.

It is understood that, the sound chamber is formed by enclosure of the sound chamber cover 15 and the supporting frame 13, as the speaker 14 operates, a sound emitted by the speaker 14 toward the sound chamber is blocked by the sound chamber cover 15, and after being reflected by the sound chamber cover 15, the sound is transmitted in a direction toward the sound exit hole 132. Further, the sound emitted by the operation of the speaker 14 is directed to diffuse in the direction toward the sound exit hole 132, so as to increase a sound sense effect of the sound exit hole 132 of the earplug component 10, improve a sound quality of the headset 100 and enhance a somatosensory vibration effect, improve usability of the headset 100, and effectively improve user experience.

Figure 16:
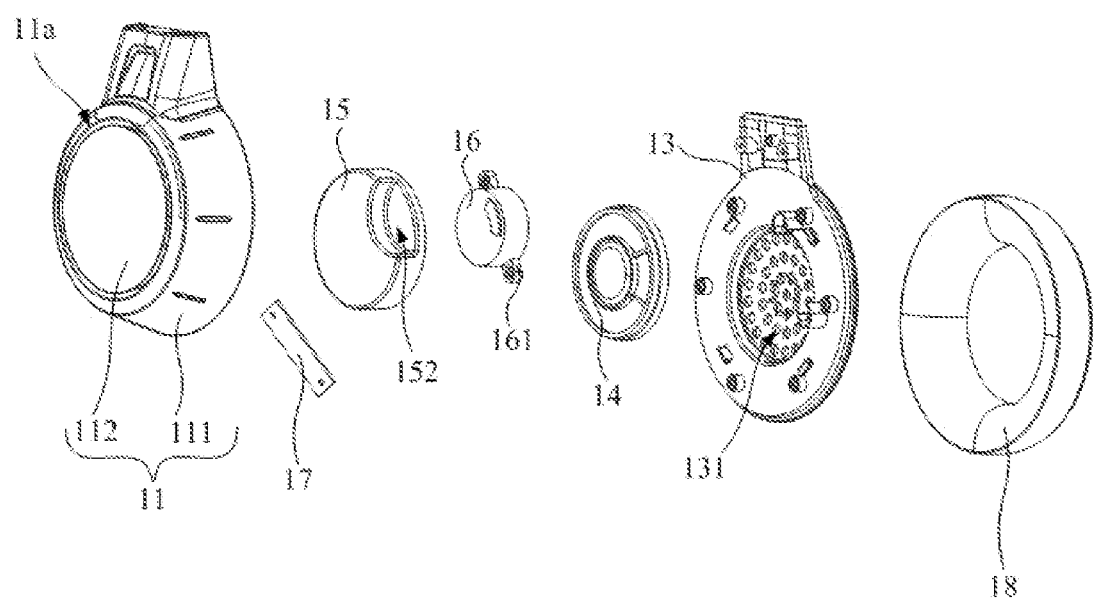
FIG. 16 is a schematic expanded view of an embodiment of the earplug component of the headset of the present application.
Figure 17:
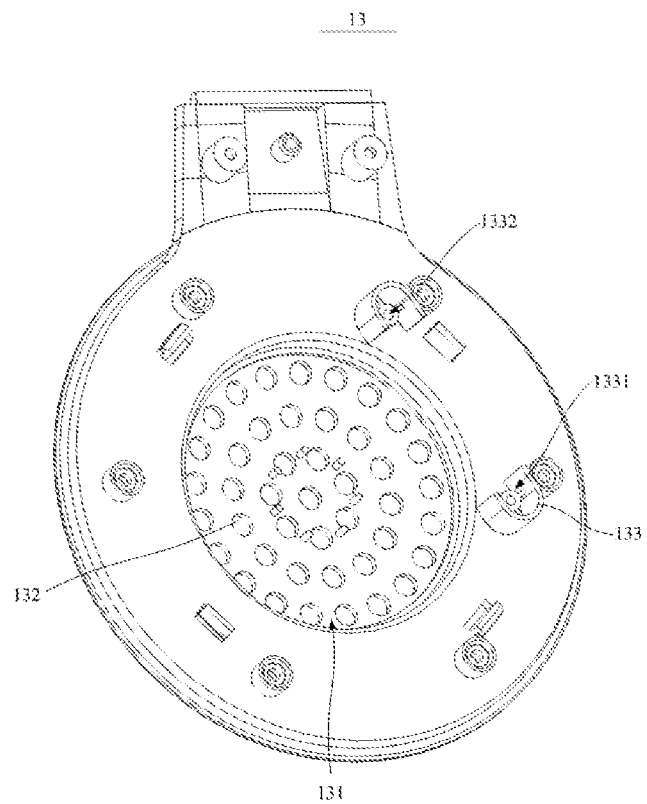
FIG. 17 is a structural view of a sound chamber cover of the earplug component of the headset of the present application.

Further, referring to FIGS. 16 and 17, a surface of the supporting frame 13 facing the accommodating cavity 1112 is recessed to define a mounting groove 131, the speaker 14 is fitted in the mounting groove 131, and the sound chamber cover 15 covers an opening of the mounting groove 131 to form the sound chamber. The mounting groove 131 is formed in the supporting frame 13 to facilitate positioning and mounting of the speaker 14, improving accuracy and efficiency of mounting. At the same time, after the speaker 14 is embedded in the mounting groove 131, a circumferential side surface of the speaker 14 is abutted and limited by inner surfaces of the mounting groove 131, so as to ensure stability of the speaker 14 after mounting, preventing the speaker 14 from shaking during operation and affecting the sound sense quality. The sound exit hole 132 is communicated with a groove bottom surface of the mounting groove 131. The sound chamber cover 15 covers the opening of the mounting groove 131 to enclose the sound chamber, so that the speaker 14 is completely accommodated in the sound chamber, thereby ensuring that the sound emitted by the speaker 14 is directed toward the sound exit hole 132 and diffuses, to increase a sound sense effect of the sound exit hole 132 of the earplug component 10.

Optionally, the sound chamber cover 15 is detachably connected to the supporting frame 13. It can be understood that the sound chamber cover 15 can be detachably connected to the supporting frame 13 by means of a snap or threaded connection, so as to facilitate operators to install or detach the sound chamber cover 15 and improve the operation efficiency. Specifically, by forming external threads at a periphery of an outer surface of the sound chamber cover 15, and forming internal threads on an inner surface of the mounting groove 131 of the supporting frame 13, connection and cooperation of the external threads and the internal threads not only ensure connection and fixation of the sound chamber cover 15 and the supporting frame 13, but also improve a sealing performance of a joint between the sound chamber cover 15 and the supporting frame 13, preventing the sound emitted by the speaker 14 during operation from leaking from the joint between the sound chamber cover 15 and the supporting frame 13. In addition, the earplug component 10 may also be provided with a sealing member, which is clamped by the sound chamber cover 15 and the supporting frame 13 to further seal the sound chamber, and further prevent the sound emitted by the speaker 14 from leaking from the joint of the sound chamber cover 15 and the supporting frame 13. It will be understood that the material of the sealing member can be an elastic material such as plastic, silica gel, or rubber, and therefore the sound chamber cover 15 may press a side surface of the sealing member to form appropriate bending and deformation of the sealing member, thereby ensuring a better blocking effect.

In one embodiment of the present application, referring to FIGS. 13 and 16, the earplug component 10 further includes a vibration motor 16 and a main control board 17. The main control board 17 is electrically connected to the speaker 14 and the vibration motor 16 respectively. The vibration motor 16 is connected to the supporting frame 13 and is located in the accommodating cavity 1112. The main control board 17 is connected to the sound chamber cover 15 and is located in the accommodating cavity 1112. The main control board 17 is electrically connected to the speaker 14 and the vibration motor 16 respectively, so that the main control board 17 can select and output corresponding subwoofer signals to the speaker 14 and the vibration motor 16 according to the received control signals for control, to improve user's subwoofer feeling and meet user's needs. In addition, the vibration motor 16 is connected to the supporting frame 13 and may be located on a same surface of the supporting frame 13 as the sound chamber cover 15, so that it is not only convenient for operators to mount and improve mounting efficiency, but also makes the vibration motor 16 closer the human ear. Therefore, the user may more easily obtain a vibration feeling and improve the use experience. The main control board 17 is connected to the sound chamber cover 15 and disposed away from the vibration motor 16, so that normal operation of the main control board 17 is prevented from being affected when the vibration motor 16 vibrates. The vibration motor 16 and the main control board 17 are both located in the accommodating cavity 1112, so as to facilitate the electrical connection between the vibration motor 16 and the main control board 17, and effectively protect the vibration motor 16 and the main control board 17. The vibration motor 16 and the speaker 14 may be independently controlled by the main control board 17, or the main control board 17 can be electrically connected to the control device 12 to simultaneously control the vibration motor 16, the speaker 14, the first light emitting member 30, and the second light emitting member 40 through the control device 12.

Figure 18:
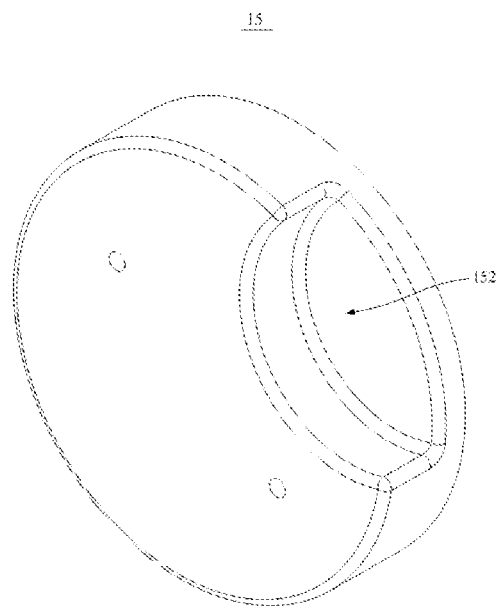
FIG. 18 is a structural view of a supporting frame of the earplug component of the headset of the present application.

Further, referring to FIG. 18, a surface of the sound chamber cover 15 facing the vibration motor 16 is recessed to define an avoidance groove 152, and a portion of the vibration motor 16 is received in the avoidance groove 152. By enabling a portion of the vibration motor 16 to be accommodated in the avoidance groove 152 of the sound chamber cover 15, both the sound chamber cover 15 and the vibration motor 16 can be mounted more compactly. Further, a volume of a whole structure of the earplug component 10 is avoided to be too large. It should be noted that there is a certain gap between the vibration motor 16 and walls of the avoidance groove 152 of the sound chamber cover 15, so as to prevent the vibration motor 16 from hitting on the sound chamber cover 15 when vibrating, so as to ensure a normal service life of the vibration motor 16 and the sound chamber cover 15.

Further, wall surfaces of the avoidance groove 152 of the sound chamber cover 15 is configured as arc surfaces. It can be understood that the wall surfaces of the sound chamber cover 15 is configured as arc surfaces, so as to prevent operators from being easily hurt by a sharp end surface during installation, improve safety during installation, meanwhile, the operators are facilitated to hold and install, and the overall sound chamber cover 15 is made to be more beautiful.

Optionally, the main control board 17 is connected to the surface of the sound chamber cover 15 facing away from the supporting frame 13, and the surface of the sound chamber cover 15 facing away from the supporting frame 13 is configured as a plane. In order to prevent the main control board 17 from being affected by vibration of the vibration motor 16, the main control board 17 can be connected and fixed on the surface of the sound chamber cover 15 facing away from the supporting frame 13, and by making the surface of the sound chamber cover 15 facing away from the supporting frame 13 as a plane, the main control board 17 can be more stably placed on the sound chamber cover 15, thereby improving stability of the main control board 17 after installation, and ensuring the normal operation of the main control board 17.

Optionally, a circumferential outer surface of the sound chamber cover 15 is protruded with anti-slip protrusions (not shown). Specifically, in order to prevent the operators from releasing the sound chamber cover 15 when installing the sound chamber cover 15, an anti-skid protrusion is protruded on the circumferential outer interface of the sound chamber cover 15 to improve a friction force between the operators and the sound chamber cover 15, and the anti-skid protrusion can be provided in a long strip shape or a dot shape, making it difficult for the operators to release the sound chamber cover 15 and saving labor. In particular, the number and size of the anti-skid protrusions can be set according to a specific size of the sound chamber cover 15, and will not be described here.

Figure 19:
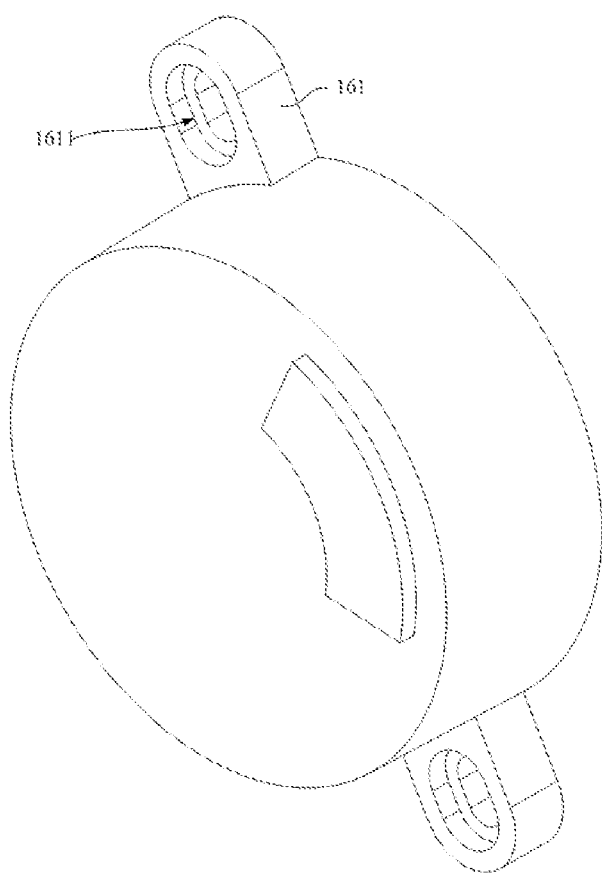
FIG. 19 is a structural view of a vibration motor of the earplug component of the headset of the present application.

In an embodiment of the present application, referring to FIGS. 17 and 19, the supporting frame 13 is provided with two limiting protrusions 133, and each limiting protrusion 133 is defined with a limiting groove 1331. The vibration motor 16 is provided with two limiting blocks 161. One of the limiting blocks 161 is embedded in one of the limiting grooves 1331 of the limiting protrusions 133, so that the vibration motor 16 is fixed to the supporting frame 13. The two limiting blocks 161 are provided at opposite ends of the vibration motor 16, so that the vibration motor 16 is balanced in force after being installed and fixed. The limiting grooves 1331 are provided on the two limiting protrusions 133 to facilitate installation and positioning of the two limiting blocks 161 and improve installation efficiency. The limiting blocks 161 is effectively limited and abutted by the limiting grooves 1331 to prevent the vibration motor 16 from being separated from the limiting protrusions 133 during the vibration process, so as to ensure a normal operation of the vibration motor 16. In addition, each limiting block 161 is defined with a first threaded hole 1611, and each limiting protrusion 133 is provided with a second threaded hole 1332. The earplug component 10 is also provided with a connecting screw that passes through the first threaded hole 1611 and the second threaded hole 1332 in sequence to further fix the limiting block 161 to the limiting protrusion 133. It should be noted that there can be a plurality of limiting blocks 161 and a plurality of limiting protrusions 133, to further improve the stability of the vibration motor 16 after installation, and the specific number can be selected by a person skilled in the art and will not be described here.

In an embodiment of the present application, referring to FIG. 15, there are a plurality of vibration motors 16, and the plurality of vibration motors 16 are connected to the surface of the supporting frame 13 facing the accommodating cavity 1112 and configured at intervals along a circumferential direction of the speaker 14. In particular there are a plurality of vibration motors 16 and in this way, a sound sense effect of the earplug component 10 may be further improved. With the plurality of vibration motors 16 connected to the surface of the supporting frame 13 facing the accommodating cavity 1112, and configured at intervals along the circumferential direction of the speaker 14, the whole earplug component 10 is balanced in force, and at the same time, the user obtains the same vibration sense from multiple directions, thereby improving the user's experience. It can be understood that when a plurality of vibration motors 16 are provided, the sound chamber cover 15 is defined with an avoidance groove 152 corresponding to each vibration motor 16, so as to make internal components of the earplug component 10 more compact to effectively utilize the internal space of the earplug component 10.

The foregoing is only an optional embodiment of the present application, and is not therefore limiting the claimed scope of the present application. All equivalent structural changes made under the inventive concepts of the present application, using the contents of the description of the application and the accompanying drawings, or direct/indirect application in other related technical fields are included in the claimed scope of the present application.

What is claimed is:

1. A headset, comprising:
   two earplug components, each of the earplug components comprising an earphone shell and a control device, wherein the earphone shell is defined with an accommodating cavity, and the control device is configured in the accommodating cavity;
   a connecting member connecting two earphone shells;
   a first light emitting component comprising a first light source and a light emitting tube, wherein the first light source is configured in the accommodating cavity of at least one of the two earphone shells and electrically connected with the control device, two ends of the light emitting tube are respectively connected with the two earphone shells, an optical adjusting member is configured between the light emitting tube and the first light source, and light emitted by the first light source is transmitted to the light emitting tube through the optical adjusting member; and
   a second light emitting component, wherein the second light emitting component is configured in at least one of two accommodating cavities and is electrically connected with the control device in the at least one of two accommodating cavities, an emitting channel communicating with the at least one of two accommodating cavity cavities is defined on a surface of one of the two earphone shells facing away from another of the two earphone shells, and the light emitted by the second light emitting component is emitted through the emitting channel;

wherein the control device comprises a circuit board, the first light source is configured on the circuit board, and the optical adjusting member is a convex lens.

2. The headset of claim 1, wherein the first light source is located at a focal position of the optical adjusting member, and the optical adjusting member is attached to an end of the light emitting tube; and/or, a cross section of the light emitting tube is in a circular shape, a height of the optical adjusting member is equal to an inner diameter of the light emitting tube.

3. The headset of claim 1, wherein, the first light emitting component comprises two light emitting tubes and the two light emitting tubes are configured at intervals, and two ends of each of the two light emitting tubes are respectively connected with the two earphone shells.

4. The headset of claim 3, wherein, the first light source is located on a middle line of a line connecting two adjacent ends of the two light emitting tubes, and the optical adjusting member comprises two mirror tubes, one end of each of the two mirror tubes is communicated with an end of one of the two light emitting tubes, and the other end of each of the two mirror tubes half covers the light source; and/or, the first light emitting component comprises two first light sources, one of the two first light sources corresponds to one of the two light emitting tubes, and the optical adjusting member is a convex lens.

5. The headset of claim 1, wherein, each of the two earphone shells comprises a body and a cover plate, the body is defined with the accommodating cavity and a mounting opening communicated with the accommodating cavity, the mounting opening is covered by the cover plate, with an edge of the mounting opening and a periphery of the cover plate enclosing to define the emitting channel.

6. The headset of claim 2, wherein, each of the two earphone shells comprises a body and a cover plate, the body is defined with the accommodating cavity and a mounting opening communicated with the accommodating cavity, the mounting opening is covered by the cover plate, with an edge of the mounting opening and a periphery of the cover plate enclosing to define the emitting channel.

7. The headset of claim 3, wherein, each of the two earphone shells comprises a body and a cover plate, the body is defined with the accommodating cavity and a mounting opening communicated with the accommodating cavity, the mounting opening is covered by the cover plate, with an edge of the mounting opening and a periphery of the cover plate enclosing to define the emitting channel.

8. The headset of claim 4, wherein, each of the two earphone shells comprises a body and a cover plate, the body is defined with the accommodating cavity and a mounting opening communicated with the accommodating cavity, the mounting opening is covered by the cover plate, with an edge of the mounting opening and a periphery of the cover plate enclosing to define the emitting channel.

9. The headset of claim 5, wherein, the emitting channel is annular; and/or, the emitting channel is arc-shaped in a direction from the accommodating cavity to an outside; and/or, the second light emitting component comprises a second light source and a light guiding plate, the second light source and the light guiding plate are both installed on the body, and light emitted by the second light source is emitted to the emitting channel after passing through the light guiding plate.

10. The headset of claim 5, wherein a side of the body facing away from the mounting opening is defined with an opening communicating with the accommodating cavity, and the earplug component further comprises:

a supporting frame connected with the body covering the opening, and defined with a sound exit hole;

a speaker connected to the supporting frame and located in the accommodating cavity; and a sound chamber cover located in the accommodating cavity, and defining a sound chamber with the supporting frame, wherein the sound exit hole is communicated with the sound chamber.

11. The headset of claim 10, wherein a surface of the supporting frame facing the accommodating cavity is recessed to form a mounting groove, the speaker is embedded in the mounting groove, and an opening of the mounting groove is covered by the sound chamber cover to form the sound chamber; and/or, the sound chamber cover is detachably connected to the supporting frame.

12. The headset of claim 10, wherein the earplug component further comprises a vibration motor and a main control board, the main control board is electrically connected with the speaker and the vibration motor, the vibration motor is connected with the supporting frame and located in the accommodating cavity, and the main control board is connected with the sound chamber cover and located in the accommodating cavity.

\* \* \* \* \*